US006557276B2

(12) United States Patent
Contoli et al.

(10) Patent No.: US 6,557,276 B2
(45) Date of Patent: May 6, 2003

(54) EARTH-MOVING MACHINE

(75) Inventors: Piercarlo Contoli, Faenza (IT); Corrado Ragazzini, Brisighella (IT)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 09/964,054

(22) Filed: Sep. 26, 2001

(65) Prior Publication Data

US 2002/0079109 A1 Jun. 27, 2002

(30) Foreign Application Priority Data

Oct. 3, 2000 (IT) ........................................ 2000A00572

(51) Int. Cl.$^7$ .................................................. B60P 1/00

(52) U.S. Cl. ............................ 37/304; 92/76; 187/234; 187/274

(58) Field of Search .......................... 37/304, 348, 403, 37/405, 406; 16/254, 267; 92/76; 414/631, 632; 187/222, 233, 234, 272, 274

(56) References Cited

U.S. PATENT DOCUMENTS 5,033,161 A * 7/1991 Chavez ........................ 16/254
5,727,921 A * 3/1998 Brown ........................ 180/237
5,899,347 A * 5/1999 Cullity ........................ 212/195
6,152,253 A * 11/2000 Monaghan .................. 180/291

FOREIGN PATENT DOCUMENTS

DE 35 45 185 C1 * 7/1987

* cited by examiner

*Primary Examiner*—Thomas B. Will
*Assistant Examiner*—Nathan Mammen
(74) *Attorney, Agent, or Firm*—John William Stader

(57) ABSTRACT

An earth-moving machine is provided with a first actuator cylinder, which can impart to a lifting arm oscillation around a corresponding pivoting shaft, and with a second actuator cylinder, which can maintain a loading unit in a pre-determined angular position during oscillation of the lifting arm itself; the first and the second actuator cylinder being disposed adjacent and parallel to one another, and being connected mechanically to one another in order to increase the resistance of the second actuator cylinder to the load generated on the second actuator cylinder itself by the lifting arm.

8 Claims, 2 Drawing Sheets

EARTH-MOVING MACHINE

BACKGROUND OF THE INVENTION

The present invention relates generally to an earth-moving machine, and, more particularly, to an earth-moving machine of the type having a single lifting arm.

Such earth-moving machines having a single lifting arm, commonly referred to as "telehandlers", adapt the single lifting arm for rotation relative to the frame itself and around a first shaft; and a loading unit, which is fitted such as to rotate relative to the lifting arm, around a second shaft, which is substantially parallel to said first shaft. U.S. Pat. No. 5,820,199 discloses a frame assembly for an operator's compartment of a construction work machine, such as an earth-moving machine. The compartment has an upper roof portion, a lower base portion and first and second side support assemblies connected between the roof portion and the base portion mid-way along the length of the compartment. Each side support assembly includes a straight part, comprised of formed tube, and a curved part, formed of a fabricated box section having several individual wall plates.

The machine additionally comprises a first actuator cylinder, which can impart to the lifting arm oscillation around the first shaft; and an orienting device, which can maintain said loading unit in a pre-determined angular position during oscillation of the lifting arm, and comprises a second and a third actuator cylinder, which are connected to one another by means of a hydraulic circuit.

Said first and second actuator cylinders have respective longitudinal shafts which are substantially parallel to one another, are disposed adjacent to one another, and below the lifting arm, and are hinged both to the frame and to the lifting arm itself, at respectively a third and fourth shaft, which are substantially parallel to the first and second shafts; and the third actuator cylinder is accommodated inside an end portion of the lifting arm which projects downwards from, and is disposed transversely relative to, the lifting arm itself, and is pivoted both on the lifting arm and on the loading unit.

During oscillation of the lifting arm around the first shaft, the second actuator cylinder is controlled by the first actuator cylinder, and in turn, and by means of said hydraulic circuit, controls functioning of the third actuator cylinder, and thus, the angular position of the loading unit around the second shaft.

Since the end portion of the lifting arm must have dimensions which are pre-determined so as not to impede the view of the loading unit by an operator located in the driving cab of the machine, the dimensions of the third actuator cylinder are also determined, i.e. its cross-section and length, and thus the capacity of oil which must be contained inside said hydraulic circuit.

In addition, when the maximum amplitude of oscillation of the lifting arm around the first shaft, and the distance between said third and fourth shafts have been determined, the length of the first and of the second actuator cylinders are also determined.

It is apparent from the foregoing that, when the length of the second actuator cylinder and the capacity of the hydraulic circuit have been determined, the cross-section of the second actuator cylinder itself is also determined.

Consequently, the known machines of the above-described type have some disadvantages, the main one of which consists of the fact that, when the amplitude of the oscillation of the lifting arm, and the distance between said third and fourth shafts exceed pre-determined values, the cross-section of the second actuator cylinder becomes relatively reduced, and the second actuator cylinder can be bent under the, and/or be damaged by the, load generated on the second actuator cylinder itself by the lifting arm.

SUMMARY OF THE INVENTION

It is an object of the present invention to provide an earth-moving machine which is free from the above-described disadvantages.

These and other objects, features and advantages are accomplished according to the instant invention by providing an earth-moving machine is provided with a first actuator cylinder, which can impart to a lifting arm oscillation around a corresponding pivoting shaft, and with a second actuator cylinder, which can maintain a loading unit in a pre-determined angular position during oscillation of the lifting arm itself; the first and the second actuator cylinder being disposed adjacent and parallel to one another, and being connected mechanically to one another in order to increase the resistance of the second actuator cylinder to the load generated on the second actuator cylinder itself by the lifting arm.

BRIEF DESCRIPTION OF THE DRAWINGS

The advantages of this invention will become apparent upon consideration of the following detailed disclosure of the invention, especially when taken in conjunction with the accompanying drawings, wherein.

DETAILED DESCRIPTION OF THE PREFERRED EMBODIMENT

Figure 1:
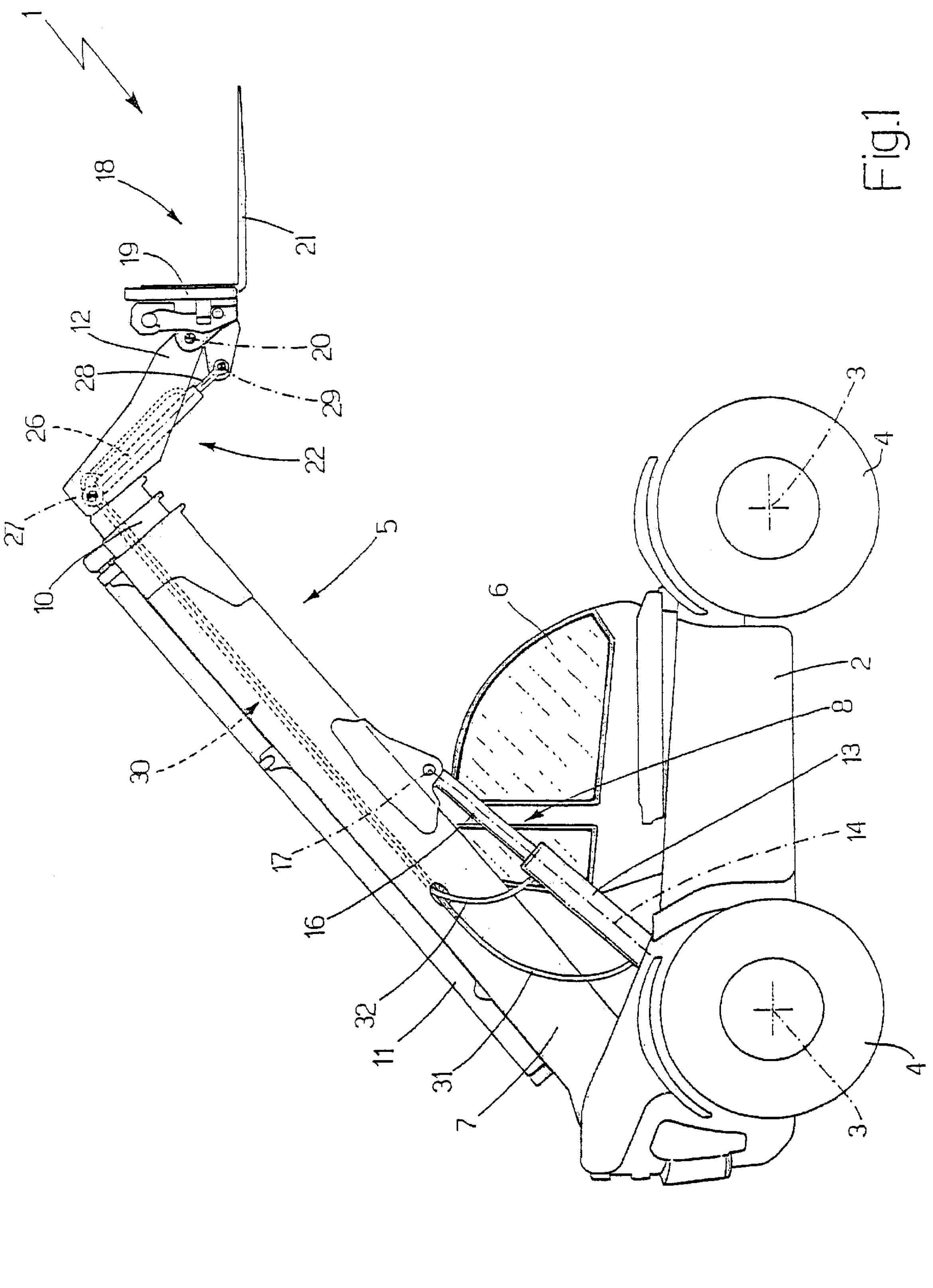
FIG. 1 is a lateral view, with parts removed for the sake of clarity, of a preferred embodiment of the machine according to the present invention.
Figure 2:
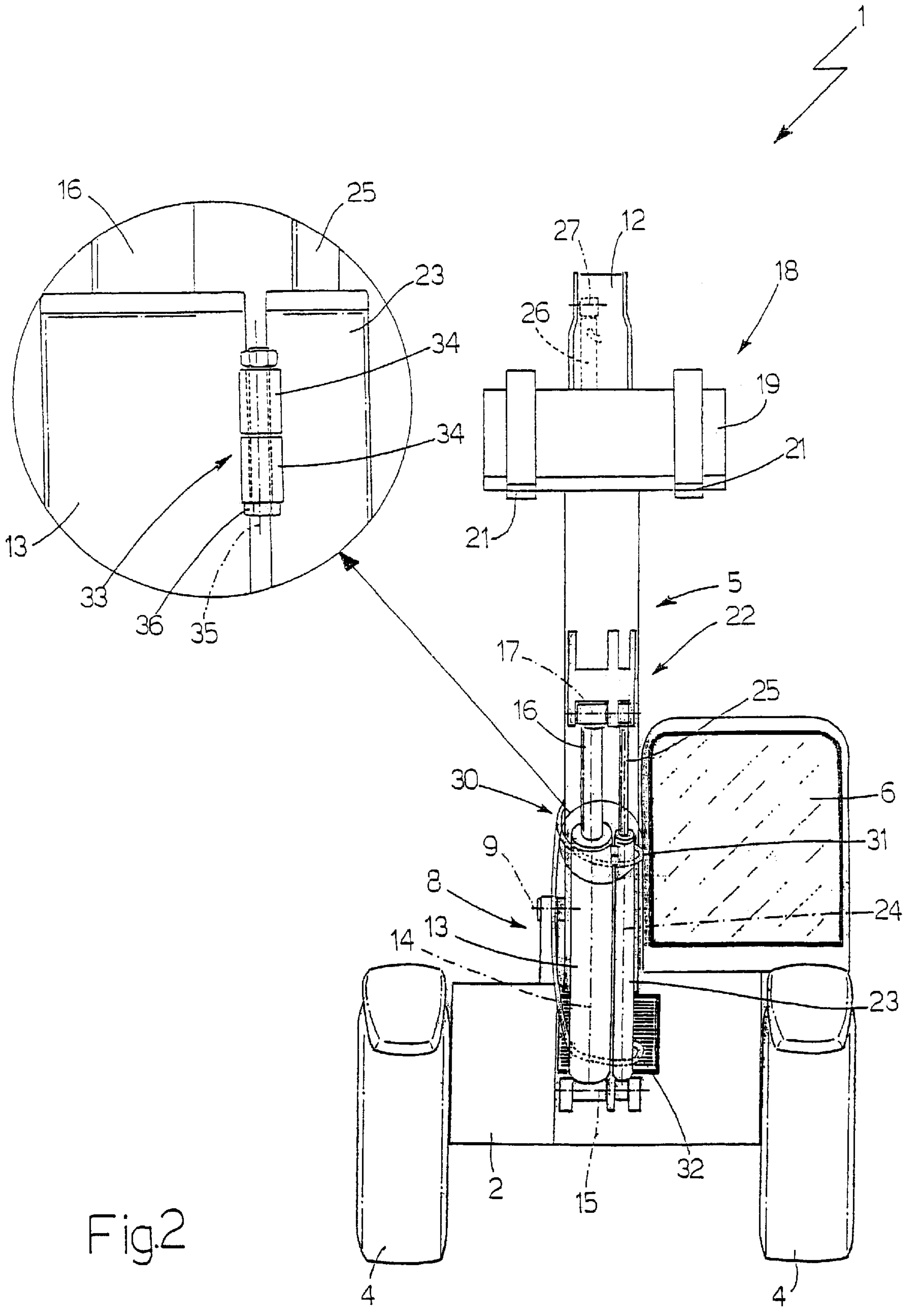
FIG. 2 is a front view, with enlarged parts, of the machine in FIG. 1.

With reference to FIGS. 1 and 2, 1 indicates as a whole an earth-moving machine comprising a frame 2 which can support two axles which are of a known type and are not illustrated, which have respective shafts 3 which are substantially parallel to one another, and are each provided with a respective pair of traction wheels 4, fitted coaxially to the corresponding shafts 3 themselves.

The machine 1 additionally comprises a lifting arm 5 of a telescopic type, a driving cab 6, which is disposed laterally relative to the arm 5, and a motor which is of a known type and is not illustrated, which can move the machine 1, and is disposed on the opposite of the cab 6, relative to the arm 5 itself.

The arm 5 comprises a portion 7 which is hinged on the frame 2, such as to oscillate, relative to the frame 2 itself, and under the thrust of an actuating device 8, around a shaft 9 which has a fulcrum substantially parallel to the shafts 3, a portion 10, which is mounted such as to slide along the portion 7, beneath the thrust of an actuator cylinder 11, and a portion 12, which is supported by the portion 10, and extends downwards, transversely relative to the portion 10 itself.

The device 8 comprises an actuator cylinder 13 of the hydraulic type, which has a longitudinal shaft 14, which is substantially transverse to the shaft 9, and is interposed between the frame 2 and an intermediate point of the portion 7 beneath the portion 7 itself. The cylinder 13 is hinged on the frame 2 at one of its free ends, in order to oscillate, relative to the frame 2 itself, around a shaft 15, with a fulcrum substantially parallel to the shaft 9, and has an output rod 16, a free end of which is hinged on the portion 7, such as to oscillate, relative to the arm 5, around a shaft 17 which has a fulcrum substantially parallel to the shaft 15.

The arm 5 is additionally provided with a loading unit 18, which is substantially in the shape of an "L", and comprises a substantially vertical plate 19, which is hinged on the portion 12, in order to oscillate, relative to the portion 12 itself, around a shaft 20 with a fulcrum substantially parallel to the shafts 15 and 17, and supports, connected to its own lower end, a fork 21 which extends perpendicularly to the plate 19 itself.

The machine 1 additionally comprises an orienting device 22, which can impart to the unit 18 oscillation around a shaft 20, such as to maintain the fork 21 substantially parallel to the ground during oscillation of the arm 5 around the corresponding shaft 9.

The device 22 comprises a double-effect actuator cylinder 23 of the hydraulic type, which is disposed beneath the portion 7, and in a position adjacent to the cylinder 13, with its own longitudinal shaft 24 substantially parallel to the shaft 14. The cylinder 23 is hinged on the frame 2 at one of its free ends, in order to oscillate, relative to the frame 2 itself, around the shaft 15, and is provided with an output rod 25, a free end of which is hinged on the portion 7, such as to oscillate, relative to the arm 5, around the shaft 17. From the foregoing, it is apparent that the cylinder 23 has a length which is substantially equivalent to the length of the cylinder 13, and a diameter which, when added to the diameter of the cylinder 13 itself, approximates by default a width of the portion 7 measured parallel to the shafts 15 and 17.

The device 22 additionally comprises a double-effect actuator cylinder 26 of the hydraulic type, which is hinged on the portion 12 at its free end, such as to oscillate, relative to the portion 12 itself, around a shaft 27 with a fulcrum which is substantially parallel to the shafts 15 and 17, and is provided with an output rod 28, a free end of which is hinged on the plate 19, such as to oscillate, relative to the plate 19 itself, around a shaft 29 with a fulcrum which is substantially parallel to the shaft 27.

Each rod 25, 28 is shaped such as to define, inside the corresponding cylinder 23, 26, two chambers with a variable volume, not illustrated; and finally, the device 22 comprises a recirculation hydraulic circuit, which in turn comprises two pipes 31, 32, each of which can connect one of said chambers of the cylinder 23 hydraulically to one of the chambers of the cylinder 26.

In use, axial displacement of the rod 25 is controlled by the axial displacement of the rod 16, and in turn, and by means of the circuit 30, controls the axial displacement of the rod 28, and thus the angular position of the unit 18 around the shaft 20.

Finally, the machine 1 comprises a connection device 33, which can connect the two cylinders 13 and 23 mechanically, such as to improve the resistance of the cylinder 23 to the load generated on the cylinder 23 itself by the lifting arm 5.

The device 33 comprises a pair of tubular bushes 34, which are welded, one onto the outer surface of the cylinder 13, and the other onto the outer surface of the cylinder 23, are disposed in a position facing and coaxially relative to one another, and have a longitudinal shaft 35, which is substantially parallel to the shafts 14 and 24, and a clamping bolt 36, which engages the two bushes 34, in a position substantially coaxial to the shaft 35 itself.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. In an earth-moving machine having a frame; a lifting arm, which is fitted such as to rotate about a first shaft; a lifting unit, which is fitted such as to rotate around a second shaft, substantially parallel to said first shaft; a first actuator cylinder, which can impart to said lifting arm oscillation around said first shaft; and an orienting device, which can maintain said loading unit in a pre-determined angular position during oscillation of said lifting arm, and is provided with a (second actuator cylinder, said first and second actuator cylinders having respective longitudinal shafts, which are substantially parallel to one another, and being hinged on said frame and lifting arm, respectively, at a third and a fourth shaft, which are substantially parallel to one another and to said first and second shafts, the improvement comprising:

mechanism connecting said first and second actuator cylinders mechanically to one another to increase the resistance of said second actuator to the load generated on the second actuator cylinder by said lifting arm, said mechanism including a first tubular member mounted on said first actuator cylinder, a second tubular member mounted on said second actuator cylinder to be positioned in register with said first tubular, and a connector interengaging said first and wherein said first and second tubular members and said connector each have a longitudinal axis which is substantially parallel to said longitudinal shafts second tubular members to mechanically connect said first and second actuator cylinders wherein said first and second tubular members and said connector each have a longitudinal axis which is substantially parallel to said longitudinal shafts.

2. The earthmoving machine of claim 1 wherein said first and second actuator cylinders are disposed adjacent to one another, and beneath said lifting arm.

3. The earth-moving machine of claim 2 wherein said first and second actuator cylinders have, respectively, a first and a second diameter; the sum of said first and second diameters approximating by default a width of said lifting arm, measured parallel to said first shaft.

4. The earth-moving machine of claim 3 wherein said orienting device further comprises:

a third hydraulic actuator cylinder, which is hinged on said lifting arm and loading unit; and a hydraulic circuit, for connection of said second and third actuator cylinders.

5. The earth-moving machine of claim 4 wherein said lifting arm is a telescopic lifting arm.

6. The earth-moving machine of claim 5 further comprising a driving cab, and propulsion means for movement of the machine itself, said propulsion means and said driving cab being disposed opposite said lifting arm.

7. The earth-moving machine of claim 1 wherein said connector is a threaded fastener that can be removed from said first and second tubular members.

8. The earth-moving machine of claim 7 wherein the first and second tubular members are positioned on the respective actuator cylinders to be aligned for insertion of said fastener when mounted on said earth-moving machine.

* * * * *